Nov. 15, 1955     M. SKOLNICK ET AL     2,724,109

SLEEP INHIBITOR FOR AUTOMOBILE DRIVERS

Filed Jan. 6, 1955

INVENTORS
MAX SKOLNICK
JULIUS BOXER
BY
ATTORNEY

United States Patent Office 2,724,109
Patented Nov. 15, 1955

2,724,109

SLEEP INHIBITOR FOR AUTOMOBILE DRIVERS

Max Skolnick, Kew Gardens, and Julius Boxer, New York, N. Y.

Application January 6, 1955, Serial No. 480,252

10 Claims. (Cl. 340—279)

This invention relates to a device for preventing accidents due to drivers falling asleep at the controls of their motor vehicles because of fatigue.

Severe accidents and death are commonplace which are caused by overtiredness of motor vehicle drivers. Generally, the overtiredness cause the driver to close his eyes and perhaps to nap momentarily. During this period the vehicle which he is driving strays from the proper path with disastrous results. It has been found that this type of accident is also caused in an increasing number of instances by drowsiness brought on by boredom. This boredom is occasioned by the uninterrupted flow of traffic and the relatively unchanging scenery which is associated with modern high speed parkways and turnpikes.

Prior art devices have been proposed to alarm a driver as soon as he begins to drowse. However, these types have for one reason and another failed to prove sufficiently satisfactory to gain wide usage. One class of prior art devices, for example, depends for operation upon the driver's head slumping down substantially from its normal position as he drowses. However, in many instances, the head does not slump substantially until the driver is completely asleep, by which time his vehicle may have already strayed into an oncoming lane of traffic or off the road entirely.

The principal object of the invention, therefore, is the provision of means for alerting the motor vehicle driver whenever be begins to drowse, which overcomes the disadvantages of prior art devices.

Another object of the invention is to construct the alerting means in such manner that it is adjustable to compensate for differences in the positions of the heads of drivers both vertically and laterally.

For further comprehension of the invention, and of the objects and advantages thereof, reference will be had to the following description and accompanying drawings, and to the appended claims in which the various novel features of the invention are more particularly set forth.

In the accompanying drawings forming a material part of this disclosure:

Figure 1:
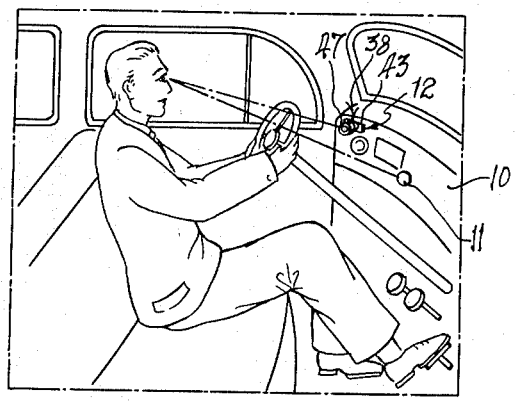
Fig. 1 is a partially diagrammatic side elevational view of the driver's compartment of a motor vehicle, illustrating a sample embodiment of the means of the invention.

Referring to Fig. 1 the reference numeral 10 designates the dashboard of a motor vehicle in which is mounted a photocell 11 which may be of any suitable type, as will be more fully described hereinafter. Preferably the photocell 11 is mounted in the dashboard to the right of the driver of the vehicle so that light beams projected from a source 12 located to the left of the driver and reflected from either or both of his eyeballs will impinge upon it. As shown, the source 12 may be mounted on the dashboard at the left of the driver. The source may be of any suitable sort but preferably it is of a type which produces a high concentration of radiation of the type most compatible with the selected photocell. Also, the photocell may, if desired, be replaced by any other light sensitive means either electrical, mechanical or chemical.

Figure 2:
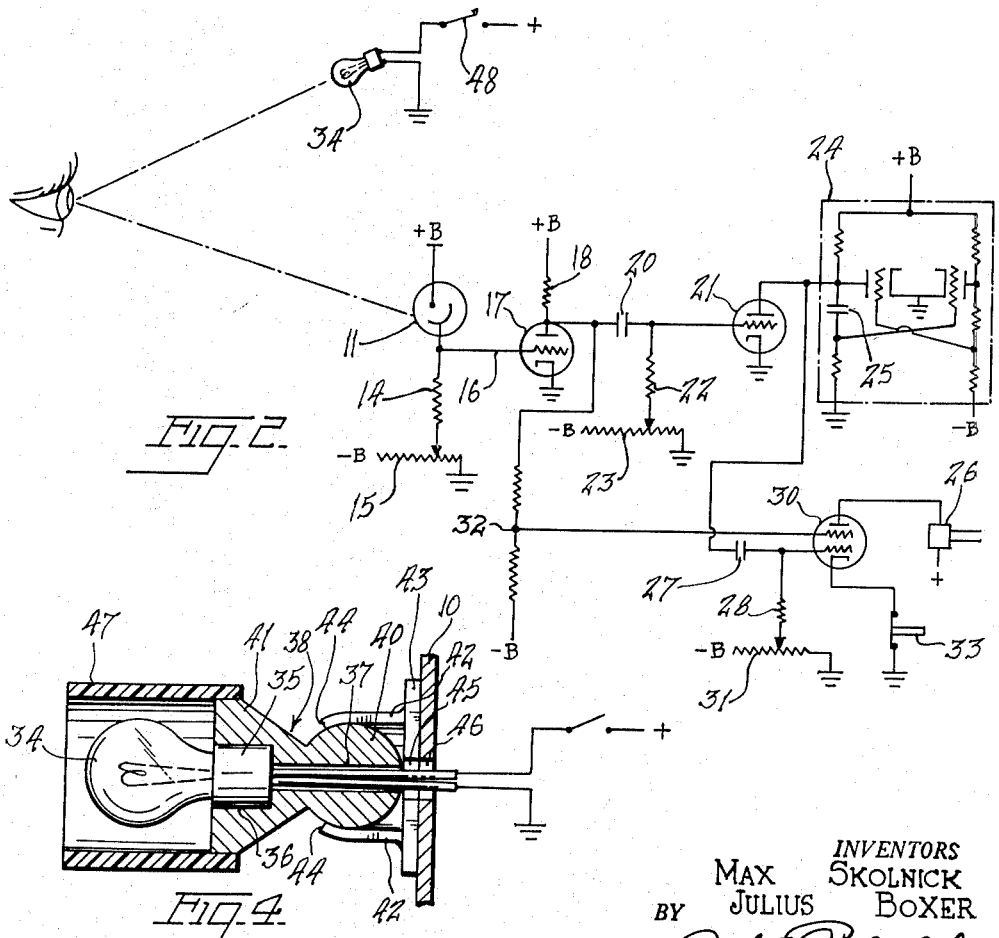
Fig. 2 is a wiring diagram of the means of the invention.

Referring now to Fig. 2 it will be seen that the anode of photocell 11 is connected to a source of positive potential designted +B. The cathode of the photocell is connected through a large resistor 14 to a source of biasing potential, preferably, to the tap of a potentiometer 15 connected between ground and a source of negative potential, designated —B. An output line 16 extended from the cathode of the photocell is directly coupled to the grid of a triode 17 having its cathode grounded and its anode connected through a resistor 18 to the +B source. The anode of triode 17 is coupled through a condenser 20 to the grid of a triode 21. This grid is also connected through a resistor 22 to a source of biasing potential, preferably the tap of a potentiometer 23 connected between ground and the —B source. The cathode of triode 21 is grounded and its anode is directly coupled to the anode of the normally nonconducting tube of a one shot multi-vibrator 24 of familiar design.

The operation of the means of the invention thus far described is as follows: While the driver of the vehicle is awake, light from the source 12 reflects from either or both of his eyeballs and impinges on photocell 11. Under these conditions output line 16 of the photocell is at a relatively high potential which maintains triode 17 in the conducting state. As soon as the driver's eye closes or otherwise stops reflecting the light of the photocell, as, for example, when the eye is moved some distance out of its normal position, the potential on output line 16 drops significantly and cuts off triode 17. This effects a rise in potential at the anode of the triode and the differentiator circuit comprising condenser 20 and resistor 22 delivers a single, sharp, positively directed pulse to triode 21. This pulse upsets the normal nonconducting state of this triode and effects momentary conduction thereof. As a result, the multivibrator 24 is triggered and changes state for a period of time determined by the magnitude of the condenser 25 which couples the anode of the normally cutoff tube thereof to the grid of the other tube in the usual manner. When the condenser 25 discharges, the multivibrator resumes its normal state.

At this point it is deemed desirable to point out that the potentiometers 15 and 23 may be adjusted to provide optimum results in properly controlling the photocell, particularly where the ambient light is relatively high with respect to the control radiation.

In order to alert the driver of the vehicle whenever light from the source 12 fails to impinge on the photocell 11 for an appreciable predetermined length of time which is chosen to take into account the normal movements of a driver's head and other normal functions such as blinking and the like, the condenser 25 of the multivibrator is so selected as to provide a relatively long time constant, say one-half second. The actual alerting of the driver may be performed by any suitable alarm means, for example, an electrical horn 26.

According to the invention, the horn 26 is sounded whenever the triode 17 remains in the cutoff state due to failure of light from the source 12 to impinge on the photocell, for a period of time greater than that for which the multivibrator is in its upset state; that is, when the triode 17 is still cut off after the multivibrator has been restored to its normal state. To this end the anode of the normally cutoff tube of the vibrator is coupled through a differentiator circuit comprising a condenser 27 and a resistor 28 to the control grid of a thyratron 30 of the type 2D21. The resistor 28 is connected to a source of bias, preferably the tap of a potentiometer 31 connected between ground and the —B source. The second grid of the thyratron is connected through a voltage divider 32 to the anode of the triode 17. Preferably the divider 32 is also connected to the —B source so as to provide potentials suitable to maintain the thyratron cutoff when the triode 17 is conducting and to allow conduction of the thyratron when the triode 17 is cut off.

The arrangement is such that when triode 17 is cut off under control of photocell 11 it applies a relatively high potential to the second grid of thyratron 30 to condition the latter for conduction. However, the bias applied to its control grid through resistor 28 maintains the thyratron cutoff. Later, when the multivibrator is restored to its normal state the anode of its normally non-conductive tube assumes a high potential which is applied to the differentiator 27, 28. The latter applies a sharp positively directed pulse to the control grid of the thyratron which fires and sounds horn 26. In the usual manner the thyratron remains in the conductive state until outside intervention breaks its cathode, anode path. In the instant embodiment of the invention the cathode of the thyratron is returned to ground through a switch 33 which the operator of the vehicle would open after having been alerted.

Figure 3:
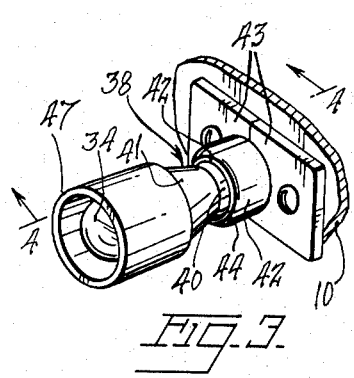
Fig. 3 is an enlarged fragmentary perspective view of a portion of the means of the invention shown in Fig. 1.
Figure 4:
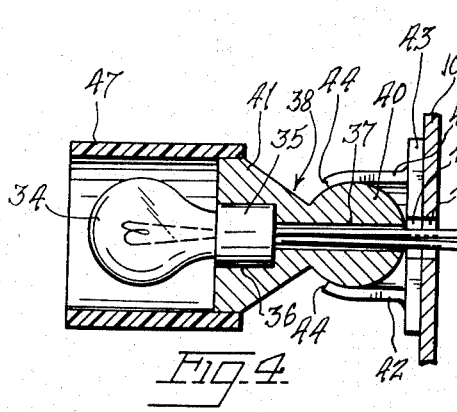
Fig. 4 is an enlarged sectional view on line 4—4 of Fig. 3.

In order to adapt the means of the invention to drivers of various heights sitting in various lateral positions, the source of light 12 is constructed as shown in Figs. 3 and 4. As indicated, the source comprises an electric lamp 34 mounted in an insulated socket 35 secured to dashboard 10 by a suitable ball and socket joint. Socket 35 is fixed in a counterbore 36 of a bore 37 extending through a member 38 which comprises the ball 40 of a ball and socket joint and an integral, flaring extension 41 of the ball. As shown the ball is rotatively mounted in a split socket comprising opposed semi-cylindrical socket pieces 42 welded or otherwise secured to base plates 43. The free ends of the pieces 42 are curved inwardly to embrace the ball as indicated at 44. Referring particularly to Fig. 3, the base plates 43 are secured to dashboard 10 with their adjacent edges and those of the socket pieces 42 abutting one another, thus the socket pieces 42 form a suitable socket for the ball 40.

As best shown in Fig. 4 the base plates 43 are provided with matched semicircular holes 45 communicating with the bore 37 and through which the wires for socket 35 are led. A matching hole 46 is also provided in dashboard 10. The size of the holes 45 is selected to permit free access to the bore 37 throughout the range of movement of the ball permitted by the flare 41 and the inwardly curved ends of the socket.

Preferably a cylindrical shield 47 is provided for lamp 34, being secured on the end of flare 41. Shield 47 serves to prevent the rays of lamp 34 from radiating in any direction other than toward a driver's eyes as determined by the positioning of the ball and, therefore, the shield.

As shown in Figs. 2 and 4, the circuit for lamp 34 extends from ground through the lamp and a suitable switch 48 to positive supply.

It is to be mentioned that if the described delay between interruption of the beam to photocell 11 and operation of horn 26 is not desired, the horn may be driven by a second triode like the triode 17 and driven thereby.

While we have illustrated and described the preferred embodiment of our invention, it is to be understood that we do not limit ourselves to the precise construction herein disclosed and that various changes and modifications may be made within the scope of the invention as defined in the appended claims.

Having thus described our invention, what we claim as new, and desire to secure by United States Letters Patent is:

1. In an automotive vehicle the combination of a source of light, a photocell adapted to be controlled by light from said source, the positions of the source and the cell relative to the driver of the vehicle being such that the light is reflected from the former to the latter by an eye of the driver, and a one-shot multivibrator having a predetermined time controlled condenser actuated by said photocell on interruption of the light reflected thereto from the source, and an alarm actuated by said multivibrator.

2. The invention according to claim 1 and including a control circuit actuated by the photocell to energize said alarm comprising a normally conducting triode cutoff on interruption of light to the photocell, a second normally nonconducting triode, a differentiator connecting the first triode to the second to effect conduction of the latter on cutoff of the former, said one shot multivibrator being triggered on conduction of the second triode and a thyratron controlled jointly by the first triode and the multivibrator to fire only when the triode remains cut off after the multivibrator returns to normal after having been triggered.

3. The combination according to claim 2 and including a differentiator connected between the multivibrator and the thyratron to effect firing of the latter as the multivibrator is restored to normal.

4. The combination according to claim 3 wherein the alarm is connected in the anode circuit of the thyratron and including a switch in the anode-cathode current path of the thyratron to extinguish the latter.

5. In an automotive vehicle the combination of a source of light, a photocell adapted to be controlled by light from said source, the positions of the source and the cell relative to the driver of the vehicle being such that the light is reflected from the former to the latter by an eye of the driver, a one-shot multivibrator having a predetermined time controlled condenser actuated on interruption of the reflected light to the photocell, an alarm actuated by said multivibrator, said light source being adjustably mounted to direct its beam differentially to compensate for varying heights of drivers and for varying lateral positions of drivers.

6. The combination according to claim 5 and including a control circuit actuated by the photocell to energize said alarm comprising a normally conducting triode cutoff on interruption of light to the photocell, a second normally nonconducting triode, a differentiator connecting the first triode to the second to effect conduction of the latter on cutoff of the former, said one shot multivibrator being triggered on conduction of the second triode and a thyratron controlled jointly by the first triode and the multivibrator to fire only when the triode remains cut off after the multivibrator returns to normal after having been triggered.

7. The combination according to claim 6 and including a differentiator connected between the multivibrator and the thyratron to effect firing of the latter as the multivibrator is restored to normal.

8. The combination according to claim 7 wherein the alarm is connected in the anode circuit of the thyratron and including a switch in the anode-cathode current path of the thyratron to extinguish the latter.

9. The combination according to claim 8 wherein the light source includes an electric lamp, and wherein the mounting therefor includes a socket therefor, a ball and socket joint adjustably mounting said socket, and a shield for directing radiation from the lamp to the driver's eyes.

10. In an automotive vehicle the combination of a source of light, a photocell adapted to be controlled by light from said source, the positions of the source and the cell relative to the driver of the vehicle being such that the light is reflected from the former to the latter by an eye of the driver, and a one-shot multivibrator having a predetermined time controlled condenser actuated by said photocell on interruption of the light reflected thereto from the source, and an alarm actuated by said multivibrator, the said source of light being adjustable to compensate for differences in the positions of drivers' eyes.

References Cited in the file of this patent

UNITED STATES PATENTS 2,172,116    Warren ---------------- Sept. 5, 1939